United States Patent [19]

Ecker

[11] 4,230,695
[45] Oct. 28, 1980

[54] ENHANCED PROTEIN ASSIMILATION WITH FRUCTOSE

[75] Inventor: Richard E. Ecker, Hinsdale, Ill.

[73] Assignee: Vitose Corporation, Clarendon Hills, Ill.

[21] Appl. No.: 710,572

[22] Filed: Aug. 2, 1976

[51] Int. Cl.² ...................... A61K 37/02; A61K 31/70
[52] U.S. Cl. .................................. 424/177; 424/180; 426/641; 536/1
[58] Field of Search .................... 424/177, 180; 536/1; 426/641

[56] References Cited

U.S. PATENT DOCUMENTS

| 3,894,148 | 7/1975 | Ecker | 424/180 |
| 3,906,114 | 9/1975 | Glabe | 426/641 |

OTHER PUBLICATIONS

Evans, "Absence . . . carbohydrate diet", CHEM Abst. vol. 83, 1975, p. 402, parag. 146201(b).
Grieger et al., "Utilization . . . diabetic rats" Metabolism, 4:166-173 (1955).
Lin et al., "Insulin biosynthesis", Cun. J. Physiol. Pharm., 47:791-801 (1969).
Miller et al., J. Clin. Invest., 31:115-125 (1952).
Miller et al., Yale J. Biol., 29:335-360 (1956).
Wilson, "Intestinal Adsorption", Saunders & Co., Philadelphia (1962).
"Protein -86"- American Protein Products, Cornwells Heights, Pa.
Evans et al., "The Absence . . . Diet", Nutr. Metabol., 17:pp. 360-367 (1974).
Albanese et al., "Utilization . . . Man", Metabolism, 1:pp. 20-25 (1952).
Albanese et al., "Effect of Age . . . by Man", Metabolism, 3:pp. 154-159 (1954).
Albanese et al., "Effect of Carbohydrates . . . Nitrogen, Metabolism", 4:pp. 160-164 (1955).
Perret, Chem. Abst., vol. 76, 1972, p. 57970 q.

Primary Examiner—Delbert R. Phillips
Attorney, Agent, or Firm—Hume, Clement, Brinks, Willian & Olds, LTD.

[57] ABSTRACT

The assimilation of dietary protein into body tissue is enhanced through a specific dietary regimen wherein a high nutritional quality protein is ingested together with a substantially pure fructose during a period when the insulin in the subjects bloodstream is maintained near basal levels.

8 Claims, No Drawings

ENHANCED PROTEIN ASSIMILATION WITH FRUCTOSE

BACKGROUND OF THE INVENTION

This invention relates generally to a novel dietary regimen and, more particularly, to a process for facilitating the assimilation of dietary protein into body tissue.

The tissues of the body are composed of a large proportion of protein, and these tissues are manufactured, repaired or replaced using materials derived from protein in the diet. Generally, healthy people will maintain a nutritionally balanced diet and a sufficiently active physical routine to meet the demand for new protein that these processes impose. There exist, however, many circumstances wherein it may be necessary or desirable for an individual to increase the assimilation of dietary protein into body tissues. For example, an athlete may desire to increase his physical strength to improve his competitive performance; or a post-surgery patient may require a special diet to facilitate tissue repair; similarly, some pregnant women may also need a special diet to meet the unique demand for new tissue protein imposed during the pre-natal development and to improve the chances of delivering a healthy baby.

At the present time anabolic steroids are utilized to promote the assimilation of protein into body tissue. These steriods, however, are prescription drugs and the consequences of their long term use are not fully understood. In addition, most athletic organizations and associations have banned their use by athletes. Accordingly, there still exists a need for a dietary supplement to facilitate the building of body tissue from dietary protein which is safe and does not require the use of potentially-hazardous drugs.

SUMMARY OF THE INVENTION

The present invention is directed to a specific dietary regimen which utilizes a dietary supplement containing both a high nutritional quality protein and substantially pure fructose. It has been discovered that the use of such a supplement in a specifically timed sequence with a subject's normal diet facilitates the assimilation of dietary protein into body tissue.

Accordingly, through the use of the present invention, those persons who find it necessary or desirable to enhance the manufacture, repair or replacement of body tissues may do so with a safe and non-prescription dietary supplement and without making any significant deviation from their normal dietary program.

DETAILED DESCRIPTION OF THE PREFERRED EMBODIMENTS

In accordance with the present invention, dietary protein is placed into the system under optimum conditions to maximize its assimilation into body tissue. In order to attain these optimizing conditions a special dietary regimen is employed. Specifically, a dietary supplement including a high nutritional quality protein and substantially pure fructose is administered during a period in which the subject's insulin is reduced to near basal levels.

The use of a high nutritional quality protein is, of course, important to the synthesis of body tissue. In the context of the present invention the term "high nutritional quality" protein is intended to mean those proteins having a protein efficiency ratio (PER) of about 2.5 or higher. Thus, preferred proteins for use in the present invention include casein, lactalbumin and hen ovalbumin. This high quality protein is administered simultaneously with substantially pure fructose in order to provide sufficient fuel for optimum protein assimilation. While the exact ratio of protein to fructose may vary depending on the particular protein used and the degree of protein assimilation desired, it has been determined that a supplement containing 1 part fructose to 1 part protein, by weight, is suitable. Preferably a supplement containing at least 1.5 parts fructose to 1 part protein is employed. Again the specific amount of supplement administered to a subject will vary widely depending upon the purposes and circumstances of the subject's overall dietary and physical program. However, a daily dosage of 25 grams of protein and 40 grams of fructose has been determined to be satisfactory in most instances.

An important aspect of the present invention is the timing of the administration of the supplement to coincide with a period when insulin in the subject's system is near basal levels. Therefore, in the practice of the present invention the subject eliminates the consumption of insulin-stimulating carbohydrates for a period prior to ingestion of the supplement sufficient to allow insulin within his or her bloodstream to drop to such a level. Preferably, the subject will eat no insulin-stimulating carbohydrate for at least two hours prior to taking the supplement. Similarly, it is necessary that insulin levels be maintained at these low values throughout the period during which the dietary protein from the supplement should normally be assimilated into body tissue. A period of at least two hours, and preferably three hours, during which no insulin-stimulating carbohydrates is consumed, has been determined as satisfactory for these purposes.

An ideal application of the process of the present invention is in the field of athletics wherein an individual is desirous of increasing his or her strength to improve athletic performance. Under such circumstances the present invention is actually directed toward enhancing muscular strength through the facilitation of protein assimilation. To obtain such an increase in muscular strength, the individual practices the invention as described above while maintaining an active physical exercise program which will work the muscles to be strengthened. It will be appreciated that practicing the present invention under these circumstances involves little or no alteration in a normal exercising and dietary program. All that is required is that the individual refrain from eating insulin-stimulating carbohydrates for approximately five hours (from 1 to 6 p.m. for example) during which period the dietary supplement is administered as disclosed above.

In addition, because intensive exercise in the 2 to 3 hours immediately following consumption of the supplement may divert energy from protein assimilation, such exercise should be avoided during that period.

While commercial protein preparations may be used in practicing the present invention, they are not necessary. Several commonly available foods can be combined into a convenient and tasty supplement that is entirely satisfactory. Examples of such supplements are set forth in the following recipes:

1. Eggnog
Combine in a blender and mix until creamy:
1 egg 1 cup cottage cheese
¼ cup granular fructose
½ teaspoon vanilla
2 tablespoons water Add 1 cup of ice water and mix thoroughly.

This preparation contains two servings of a tasty eggnog; each serving contains 25 grams of high-quality protein and 40 grams of fructose. One serving can be drunk immediately and the other refrigerated for use the following day.

2. Refrigerated Dessert

Prepare the first five ingredients in a blender as shown above in Recipe No. 1.

Dissolve in 1 cup boiling water:
1 tablespoon unflavored gelatin

Add the contents of the blender to the gelatin solution and cook over low heat, with stirring, for 5 minutes. Dispense into convenient containers and refrigerate. Makes two servings.

Alternatively the supplement may be administered as an oral dosage in tablet form.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A process for facilitating the assimilation of dietary protein into body tissue comprising:

orally administering to a subject a dietary supplement including substantially pure fructose and a protein having a protein efficiency ratio of about 2.5 or greater; and eliminating the consumption by said subject of substantially all insulin-stimulating carbohydrates for a period prior to said oral administration of sufficient duration to reduce the insulin present in the bloodstream of said subject at the time of said administration to near basal levels and for a period subsequent to said oral administration of sufficient duration to allow substantially complete assimilation of said protein into body tissue.

2. The process of claim 1 wherein said prior period is at least two hours.

3. The process of claim 1 wherein said subsequent period is at least two hours.

4. The process of claim 1 wherein said prior period is at least two hours and said subsequent period is at least three hours.

5. The process of claim 1 wherein said dietary supplement includes, by weight, about 1 part protein and about 1.5 parts fructose.

6. The process of claim 1 wherein said dietary supplement includes a protein selected from the group consisting of casein, lactalbumin and hen ovalbumin.

7. The process of claim 1 wherein said dietary supplement is administered in a daily dosage of about 25 grams protein and about 40 grams fructose.

8. In a process for increasing the muscular strength of a person wherein said person conducts activity to work the muscles to be strengthened, the improvement comprising:

administering to said person a dietary supplement including substantially pure fructose and a protein having a protein efficiency ratio of about 2.5 or greater; and eliminating the consumption by said person of substantially all insulin-stimulating carbohydrates for at least two hours prior to and after the administration of said supplement.

* * * * *

UNITED STATES PATENT AND TRADEMARK OFFICE
CERTIFICATE OF CORRECTION

PATENT NO.    : 4,230,695
DATED         : October 28, 1980
INVENTOR(S)   : Richard E. Ecker It is certified that error appears in the above-identified patent and that said Letters Patent are hereby corrected as shown below:

IN THE LISTING OF REFERENCES CITED, UNDER "OTHER PUBLICATIONS":

At line 3, please delete "Grieger" and substitute therefor --Geiger--;

At line 5, please delete "Cun." and substitute therefor --Can.--;

At line 9, please delete "Adsorption" and substitute therefor --Absorption--;

At line 21, please delete "57970 q" and substitute therefor --27970q--;

IN THE ABSTRACT:

At line 5, please delete "subjects" and substitute therefor --subject's--.

Signed and Sealed this

Thirty-first Day of March 1981

[SEAL]

Attest:

RENE D. TEGTMEYER

Attesting Officer   Acting Commissioner of Patents and Trademarks